United States Patent [19]

Vaughn et al.

[11] Patent Number: 4,519,033
[45] Date of Patent: May 21, 1985

[54] CONTROL STATE SEQUENCER

[75] Inventors: Herchel A. Vaughn; Ashok H. Someshwar, both of Austin, Tex.

[73] Assignee: Motorola, Inc., Schaumburg, Ill.

[21] Appl. No.: 404,073

[22] Filed: Aug. 2, 1982

[51] Int. Cl.³ .......................... G06F 9/06; G06F 9/22
[52] U.S. Cl. .................................. 364/200; 364/900
[58] Field of Search ... 364/200 MS File, 900 MS File

[56] References Cited

U.S. PATENT DOCUMENTS

| 4,038,643 | 7/1977  | Kim .................................. 364/200 |
| 4,168,523 | 9/1979  | Chari et al. ....................... 364/200 |
| 4,367,524 | 1/1983  | Budde et al. ....................... 364/200 |
| 4,412,252 | 10/1983 | Moore et al. ...................... 358/160 |

Primary Examiner—James D. Thomas
Assistant Examiner—Thomas Lee
Attorney, Agent, or Firm—Anthony J. Sarli, Jr.; Jeffrey Van Myers; James L. Clingan, Jr.

[57] ABSTRACT

A control state sequencer for controlling the execution of instructions of a microprocessor uses a PLA and a ROM to detect the current control state and instruction being processed by a processing unit and to provide the next control state of the instruction to the processing unit. An initial-state PLA and initial-state ROM detect when a new instruction is to be processed by the processing unit and provides the initial clock state of the new instruction to the processing unit.

5 Claims, 9 Drawing Figures

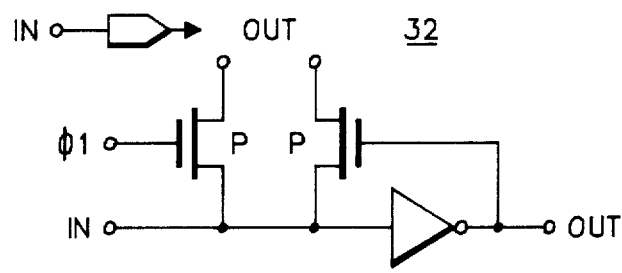
*Fig. 6*
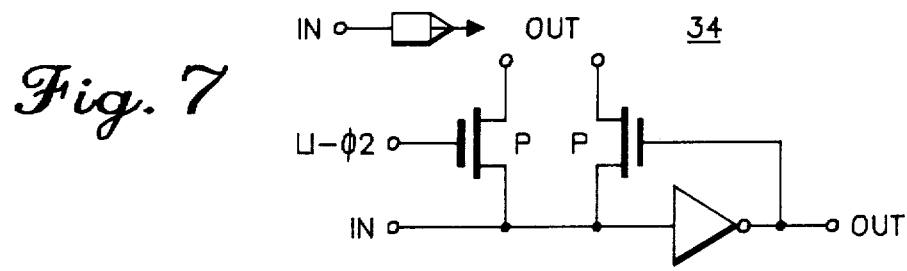
*Fig. 7*
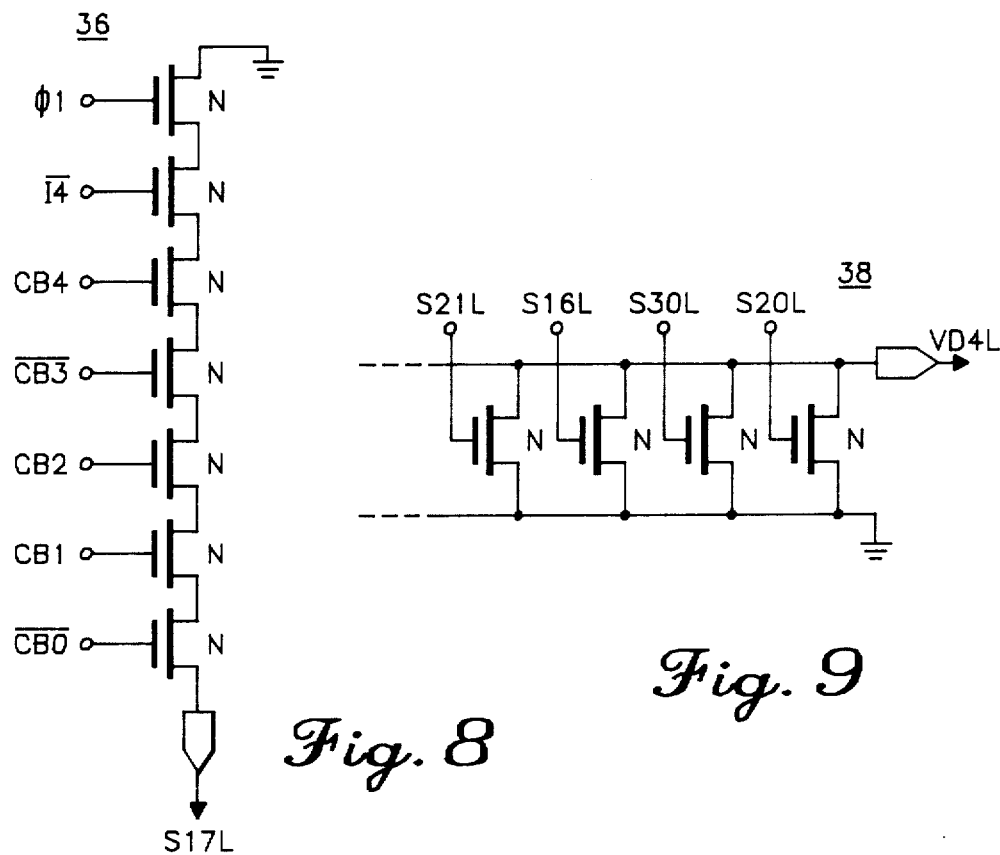
*Fig. 8*
*Fig. 9*

CONTROL STATE SEQUENCER

FIELD OF THE INVENTION

This invention relates to microprocessors which execute instructions comprised of predetermined sequences of control states, and more particularly to circuits which control the sequence of the control states.

A typical microprocessor processes instructions comprised of predetermined sequences of control states. The microprocessor executes an instruction by executing, in the predetermined order, the control states which comprise the instruction. A control state sequencer provides the control states to a processor in the predetermined order. The control state sequencer monitors the instruction to be executed along with the control state being executed to determine the next clock state. In the past the control state sequencer has been comprised of predominately random logic e.g., NOR gates, NAND gates, etc. In some cases a portion of the control state sequencer has been a programmable logic array (PLA) but always in conjunction with substantial random logic. The use of random logic for providing the next control state has been more and more cumbersome as the instructions have grown in number and complexity. The routing of conduction lines interconnecting the random logic have grown to be very complex. Even a minor change in the makeup of an instruction could result in significant layout problems for the corresponding change in the random logic. Additionally, random logic requires substantial chip area.

SUMMARY OF THE INVENTION

An object of the present invention is to provide an improved control state sequencer.

Another object of the invention is to provide a control state sequencer comprised of a PLA and a ROM array.

Yet another object of the invention is to provide a control state sequencer susceptible to a systematic layout.

These and other objects of this invention are achieved in a microprocessor having a processing unit for processing instructions comprised of a predetermined sequence of control states wherein a control state sequencer provides the proper sequence of control states to the processing unit. The control state sequencer comprises a ROM array, having a plurality of input lines each corresponding to a control state, programmed to provide, in response to an input line being enabled, the control state which corresponds to the input line which is enabled; and a PLA having a plurality of input lines for receiving an instruction code representative of an instruction and for receiving a control state of the represented instruction, and having a plurality of output lines coupled to the input lines of the ROM array, wherein the PLA is programmed to enable the input line of the ROM which corresponds to a next control state.

BRIEF DESCRIPTION OF THE DRAWINGS

FIG. 6 is a detailed schematic of one type of sense amplifier used in the control state sequencer shown in FIG. 2.

FIG. 7 is a detailed schematic of a second type of sense amplifier used in the control state sequencer shown in FIG. 2.

FIG. 8 is a detailed schematic of a column of a PLA used in the control state sequencer shown in FIG. 2.

FIG. 9 is a detailed schematic of a portion of a column of a ROM array used in the control state sequencer shown in FIG. 2.

DESCRIPTION OF A PREFERRED EMBODIMENT

Figure 1:
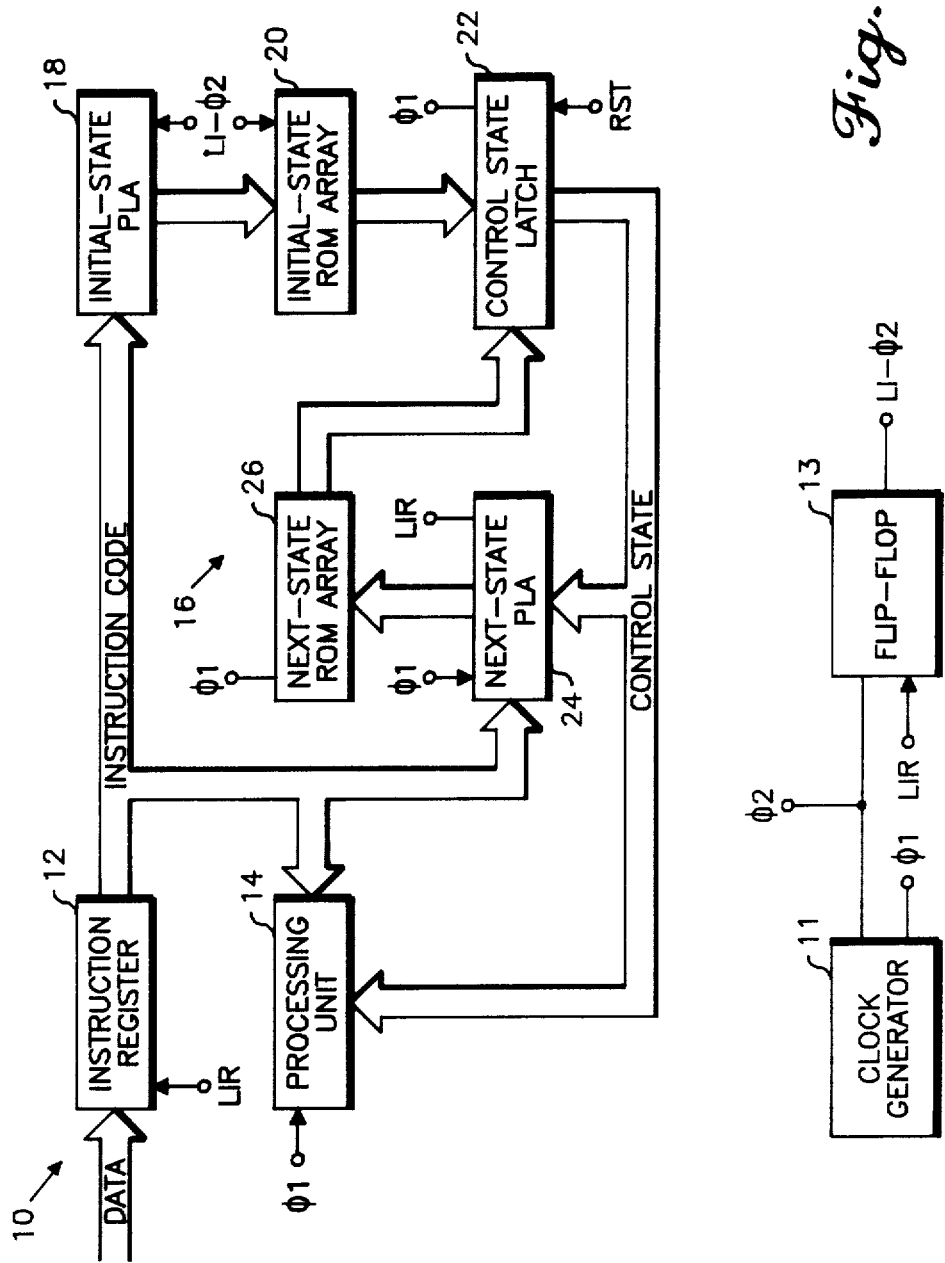
FIG. 1 is a block diagram of a portion of a microprocessor including a control state sequencer according to a preferred embodiment of the invention.
Figure 3:
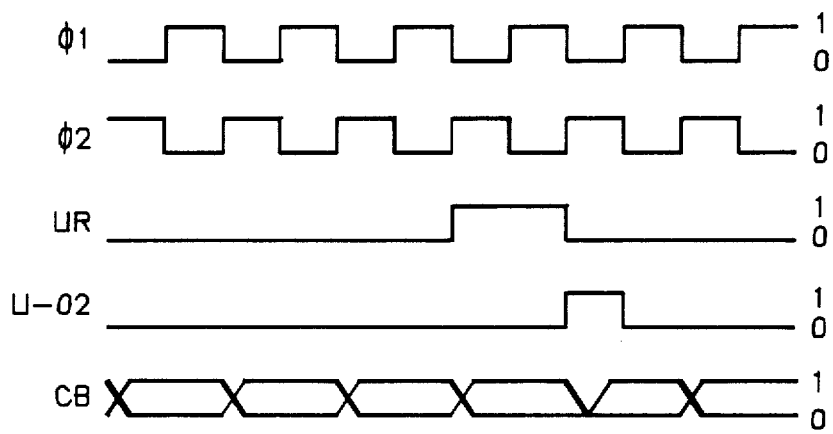
FIG. 3 is a timing diagram of signals useful in the operation of the control state sequencer.

Shown in FIG. 1 is a block diagram of a portion of a microprocessor 10 constructed according to a preferred embodiment of the invention comprised generally of a clock generator 11, an instruction register 12, a flip-flop 13, a processing unit 14, and a control state sequencer circuit 16. Control state sequencer 16 is comprised generally of an initial-state PLA 18, an initial-state ROM array 20, a control state latch 22, a next-state PLA 24, and a next- state ROM array 26. Microprocessors typically operate on either a two or four phase clock. In the preferred embodiment the clock is chosen to be two phase for microprocessor 10. The clock has two clock signals ∅1 and ∅2 which are complementary of each other as shown in FIG. 3. Signals ∅1 and ∅2 each cycle between a logic "0" and a logic "1". A portion of signal ∅1 which is a logic "1" is called a time ∅1. A portion of signal ∅2 which is a logic "1" is called a time ∅2. The actual processing of control states by processing unit 14 occurs during time ∅1.

Processing unit 14 receives an instruction code representative of an instruction from instruction register 12 and receives a control state to process from latch 22. An instruction code is loaded into instruction register 12 during a load instruction register signal LIR shown in FIG. 3. The instruction code is then provided by instruction register 12 to processing unit 14 and initial-state PLA 18. Initial-state ROM array 20 has a plurality of input lines, in this case eight input lines, each representative of a clock state. ROM array 20 is programmed to provide a clock state output to latch 22 which corresponds to an input line which is enabled. In the present case there are 210 possible instructions, but there is substantial duplication as to the initial clock state in the 210 sequences of clock states which comprise the 210 instructions. In the present case, there are only eight different initial clock states. Accordingly stored in ROM array 20 are these eight possible initial clock states of the 210 instructions. PLA 18 is programmed to enable the input line which corresponds to the initial clock state of the instruction repesented by the instruction code received. Upon termination of signal LIR, which is coupled from PLA 24 to flip-flop 13, a delayed load instruction enable signal LI-∅2 from flip-flop 13 enables PLA 18 which responds by enabling the input line of ROM array 20 which corresponds to the initial clock state of the represented instruction. Latch 22 couples the received initial control state to processing unit 14. A clock signal ∅1 as shown in FIG. 3 is then received by latch 22. Latch 22 continues to provide the initial control state of the represented instruction to processing unit 14. This initial control state is also provided to PLA 24 by latch 22.

PLA 24 receives the clock state provided by latch 22 as well as the instruction code provided by instruction register 12. Next-state ROM array 26 has a plurality of input lines, in this case 24, coupled to PLA 24. Each input line corresponds to a particular control state. When an input line is enabled, the corresponding control state is coupled to latch 22. Because each instruction comprises a predetermined sequence of control states, knowing the instruction and the control state defines the next control state which follows in the sequence. PLA 24 is programmed to enable the input line of ROM array 26 which corresponds to the next control state in response to the instruction code of the current instruction and the control state currently provided by latch 22. PLA 24 is enabled to respond to the current instruction code and control state by receiving signal ∅1. During time ∅1, latch 22 receives the next control state from ROM array 26 but continues to output the current control state. Upon the termination of time ∅1 latch 22 switches its output to the clock state received from ROM array 26 which then becomes the current control state. Shown in FIG. 3 is a timing diagram of the output of latch 22 shown as CB. When a horizontal line is present at both "1" and "0", latch 22 is providing a valid clock state.

Although PLA 24 receives the current control state during time ∅2, PLA 24 does not respond until time ∅1. Latch 22 continues to output the current control state during time ∅2. Upon the next time ∅1, PLA 24 responds by enabling the input line of ROM array 26 which corresponds to the next control state in the sequence of control states of the instruction. During time ∅1, ROM array 26 again provides the next control state to latch 22 while latch 22 continues to provide the current control state as its output. Again upon the termination of time ∅1 the clock state on the input of latch 22 is then switched to the output of latch 22. The cycle of PLA 24 determining the next clock state and enabling the input line of ROM array 26 which corresponds to the clock state, of ROM array 26 providing the next clock state to latch 22, of latch 22 switching its output to the clock state provided by ROM array 26, of PLA 24 again determining the control state which is to follow the control state on the output of latch 22, and so forth, continues until the last control state of the instruction is provided by latch 22 on its output.

After time ∅1 of the last control state of an instruction, signal LIR is provided for consecutive times ∅2 and ∅1. During signal LIR following the last clock state of an instruction, latch 22 provides one of two possible load instruction control states to processing unit 14. A load instruction clock state is a clock state used between instructions to allow processing unit 14 to prepare for the next instruction. ROM array 26 is programmed to provide the particular load instruction control state in response to a corresponding input line being enabled by PLA 24. PLA 24 is programmed to enable one of the input lines of ROM array 26 which corresponds to a load instruction control state in response to receiving the last control state of the instruction. PLA 24, ROM array 26, and latch 22 cooperate together to provide the load instruction control state in the same manner as for providing the next control state following the current control state of an instruction. The particular load instruction control state is dependent upon the last instruction. During signal LIR, processing unit 14 prepares to execute the next instruction. Because processing unit 14 may be left in slightly different operating conditions after completion of different instructions, preparation for the next instruction may vary depending upon the instruction just executed. Accordingly, the particular load instruction control state is selected dependent upon the instruction just executed.

PLA 24 is programmed such that it will not enable any input line of ROM array 26 when either of the load instruction control states is present. At the termination of signal LIR and time ∅1, latch 22 will consequently tend to be driven to a logic "0" output. PLA 18 and ROM array 20, however, will cause latch 22 to provide the initial control state of the instruction loaded into instruction register 12 during signal LIR in response to signal LI-∅2 as described previously. ROM array 26, PLA 24, and latch 22 again cooperate together to sequence the control states of the instruction to processing unit 14. Consequently the cycle of execution of instructions is established.

Figure 2:
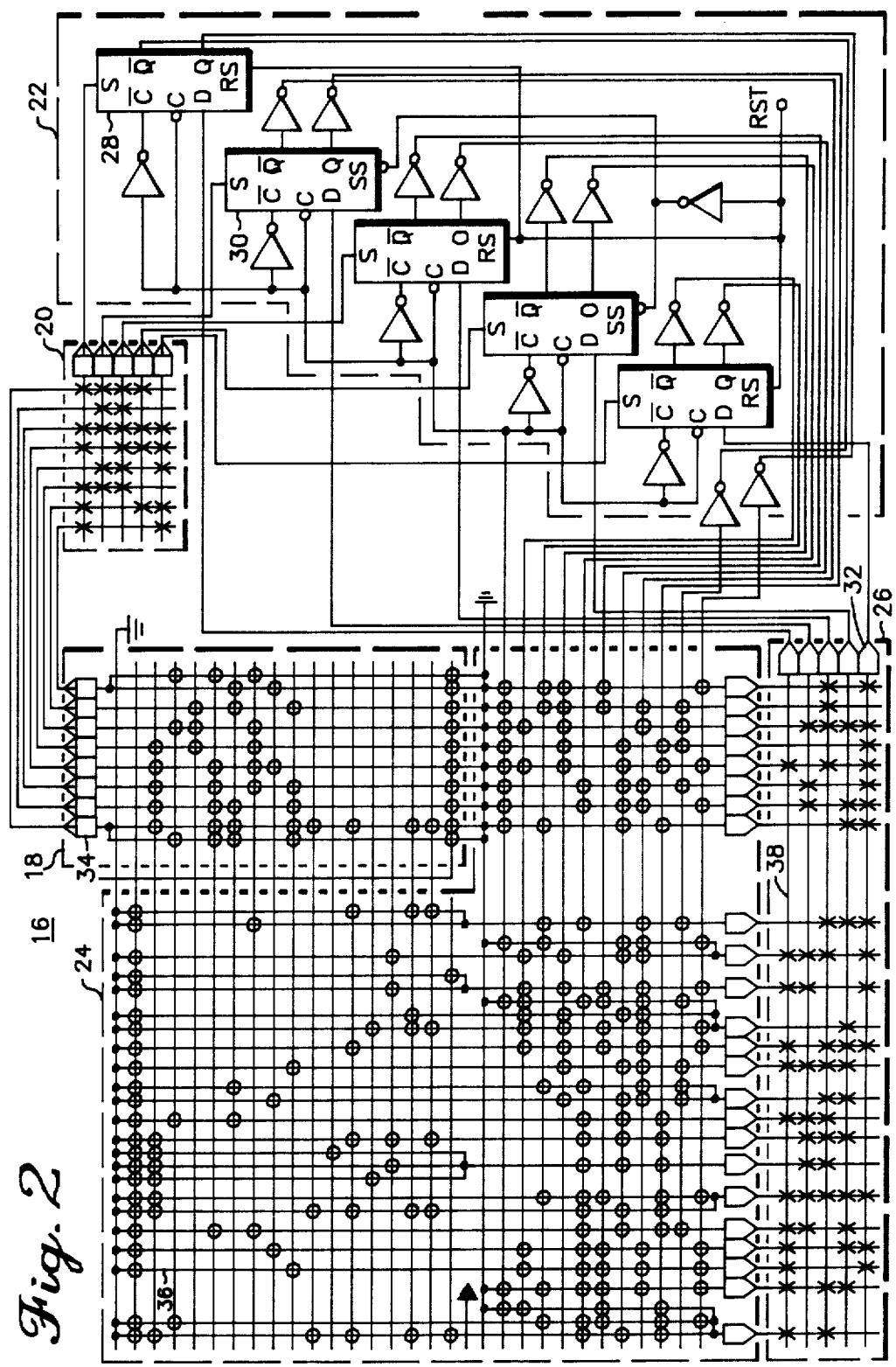
FIG. 2 is a circuit diagram of the control state sequencer of FIG. 1.
Figure 4:
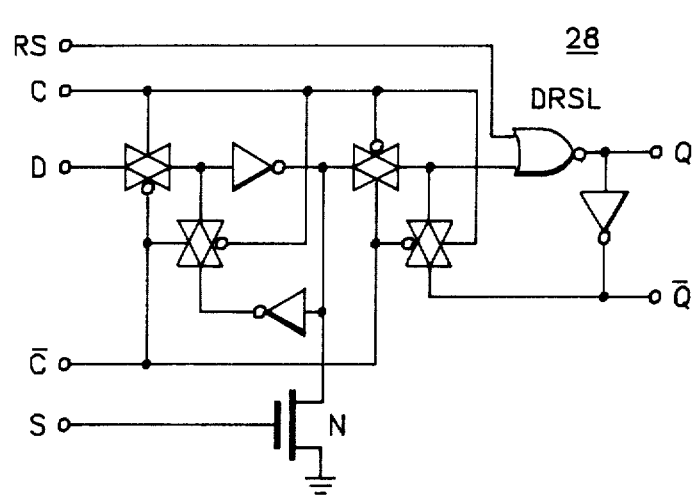
FIG. 4 is a detailed schematic of one type of D flip-flop used in the control state sequencer shown in FIG. 2.
Figure 5:
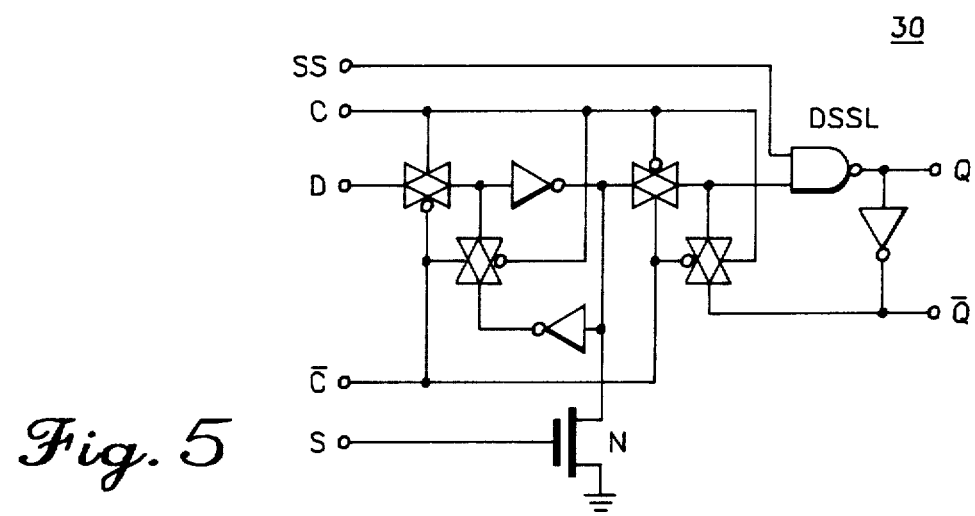
FIG. 5 is a detailed schematic of a second type of D flip-flop used in the control state sequencer shown in FIG. 2.

Shown in FIG. 2 is control state sequencer 16 in circuit diagram form. Latch 22 as shown is comprised generally of five negative-edge-triggered D flip-flops of two types, DRSL and DSSL. A flip-flop 28 is of the DRSL type, and a flip-flop 30 is of the DSSL type. Details of flip-flop 28 and flip-flop 30 are shown in FIG. 4 and FIG. 5, respectively. The difference between the two types is that flip-flop 28 is reset to a logic low in response to a reset signal RST being a logic high, whereas flip-flop 30 is set to a logic high in response to a reset signal NRST being a logic low. This difference allows latch 22 to provide a predetermined output other than all logic "0" or all logic "1" in response to the reset signal. Whereas flip-flops 28 and 30 are useful for constructing latch 22, other devices could also be used to construct a similarly functioning latch.

PLA 18, PLA 24, ROM array 20, and ROM array 26 each use sense amplifiers of the same construction but triggered by different clock signals. A sense amplifier 32, shown in FIG. 2, for ROM array 26 is clocked by signal ∅1. A detailed schematic of sense amplifier 32 is shown in FIG. 6. Sense amplifier 32 is the type also used for PLA 24. A sense amplifier 34, shown in FIG. 2, for PLA 18 is clocked by signal LI-∅2. A detailed schematic of sense amplifier 34 is shown in FIG. 7. Sense amplifier 34 is the type also used by ROM array 20.

Each column of PLA 18 and PLA 24 is comprised of a predetermined series of N channel transistors for receiving signals. A typical column 36 is shown in FIG. 2. A detailed schematic of column 36 is shown in FIG. 8. Column 36 receives signal ∅1, an instruction signal I4 and clock state signals CB4, $\overline{CB3}$, CB2, CB1, and $\overline{CB0}$.

Each column of ROM array 20 and ROM array 26 has a predetermined set of transistors coupled between the column and ground for receiving signals. A typical column 38 of ROM array 26 is shown in FIG. 2. A detailed schematic of a portion of column 38 is shown in FIG. 9. Output of column 38 is a bit VD4E of a control state code.

The load instruction register signal LIR is effectively generated by PLA 24 as shown in FIG. 1 by enabling one of the input lines of ROM 26 which corresponds to one of the two load instruction control states. The two input lines which correspond to the two load instruction control states are an input line S5L and an input line S13L. Signal LIR is actually produced by a logic OR operation on the signals present on input lines S5L and S13L.

The circuit diagram of FIG. 2 depicts a specific programming of ROMs and PLAs for providing specific sets of clock states for specific instructions. One of ordinary skill in the art can see that this specific programming will change for any change in the nature of the clock states or instructions. With the shown circuit of FIG. 2, one of ordinary skill in the art can develop his own programming by the conventional use of Karnaugh mapping. PLA 24 acts as a decoder for providing one of a plurality of output signals representative of a next control state in response to the current instruction code and control state. ROM array 26 acts as an encoder to provide the next control state in response to receiving the output signal representative of the next control state. It is readily apparent that such usage of arrays simplifies laying out of the circuit, reduces problems in correcting errors, and reduces chip area.

It should also be pointed out that under certain circumstances PLA 24 can enable more than one input line but still define a single control state. For example, input lines S30L and S8L can sometimes be enabled at the same time when the control state corresponding to input line S30L is to be next. This is not harmful in such a case because the output of ROM array 26 will not be effected by the additional enabling of input line S8L. Of course, when the clock state corresponding to input line S8L is to be next, input line S30L will not be enabled. The fact that two input lines can under such circumstances be simultaneously enabled without adverse effect can be used to advantage to simplify an array such as PLA 24.

While the invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

We claim:

1. A control state sequencer for use with a microprocessor having a processing unit for processing instructions comprised of a predetermined sequence of control states, comprising:
a first ROM array, having a plurality of input lines each corresponding to a control state, programmed to provide, in response to an input line being enabled, the control state which corresponds to the input line which is enabled;
a first PLA having a plurality of input lines for receiving an instruction code representative of an instruction and for receiving a current control state of the represented instruction, and having a plurality of output lines coupled to the input lines of the first ROM array; wherein the first PLA is programmed to enable the input line of the first ROM array which corresponds to a next control state, wherein the next control state is a control state which follows the current control state in the predetermined sequence of control states of said represented instruction, wherein the first PLA provides a load instruction register signal in response to receiving the last control state in the predetermined sequence of control states of the represented instruction, and wherein the first PLA enables an input line of the first ROM array which corresponds to an intermediate control state, said intermediate control state for preparing the processing unit to begin processing another instruction; and
latch means for receiving the next control state from the first ROM array and for providing the current control state to the first PLA and to the processing unit in response to a clock signal.

2. A control state sequencer for use with a microprocessor having a processing unit for processing instructions comprised of a predetermined sequence of control states, comprising:
a first ROM array, having a plurality of input lines each corresponding to a control state, programmed to provide, in response to an input line being enabled, the control state which corresponds to the input line which is enabled;
a first PLA having a plurality of input lines for receiving an instruction code representative of an instruction and for receiving a current control state of the represented instruction, and having a plurality of output lines coupled to the input lines of the first ROM array, wherein the first PLA is programmed to enable the input line of the first ROM array which corresponds to a next control state, wherein the next control state is a control state which follows the current control state in the predetermined sequence of control states of said represented instruction;
an initial-state ROM array, having a plurality of input lines, each corresponding to an initial control state of an instruction, programmed to provide to the first PLA, in response to an input line being enabled, the initial control state which corresponds to the input line which is enabled; and
an initial-state PLA having a plurality of input lines coupled to the input lines of the first PLA for receiving the instruction code representative of the instruction, and a plurality of output lines coupled to the input lines of the initial-state ROM array, wherein the initial-state PLA is programmed to enable the input line of the initial-state ROM array which corresponds to the initial control state of the instruction in response to receiving the instruction code and an instruction enable signal.

3. The control state sequencer of claim 2 further comprising:
latch means coupled to the first ROM array for receiving the next control state from the first ROM array and for providing the current control state to the first PLA and to the processing unit.

4. The control state sequencer of claim 3 wherein the latch means is further characterized as providing the next control state to the first PLA and the processing unit in response to a clock signal.

5. The control state sequencer of claim 4 wherein the latch means is further characterized as coupled to the initial-state ROM array for receiving the initial clock state when provided thereby, and then providing said initial clock state to the processing unit and the first PLA.

* * * * *